Nov. 13, 1956 J. C. STEVENS 2,770,133
LIQUID LEVEL INDICATING APPARATUS
Filed June 29, 1954 4 Sheets-Sheet 1
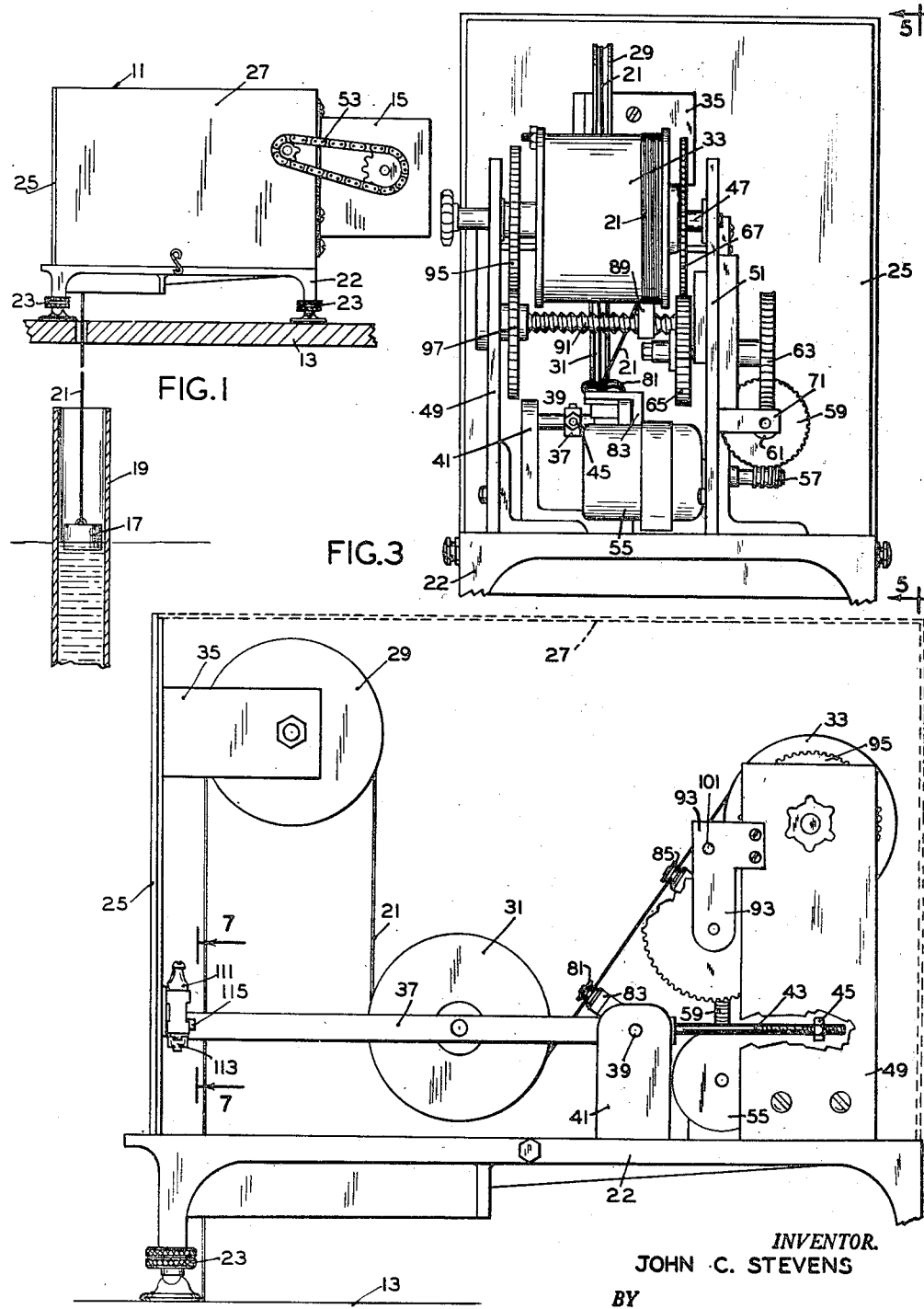
INVENTOR.
JOHN C. STEVENS
BY
Buckhorn and Cheatham
ATTORNEYS

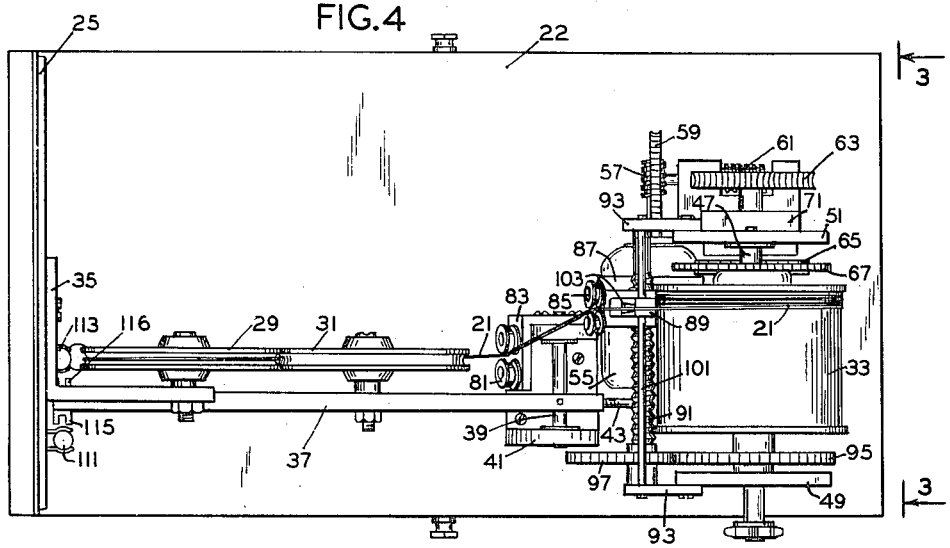

Nov. 13, 1956  J. C. STEVENS  2,770,133
LIQUID LEVEL INDICATING APPARATUS
Filed June 29, 1954  4 Sheets-Sheet 3

INVENTOR.
JOHN C. STEVENS
BY
Buckhorn and Cheatham
ATTORNEYS

Nov. 13, 1956  J. C. STEVENS  2,770,133
LIQUID LEVEL INDICATING APPARATUS
Filed June 29, 1954  4 Sheets-Sheet 4
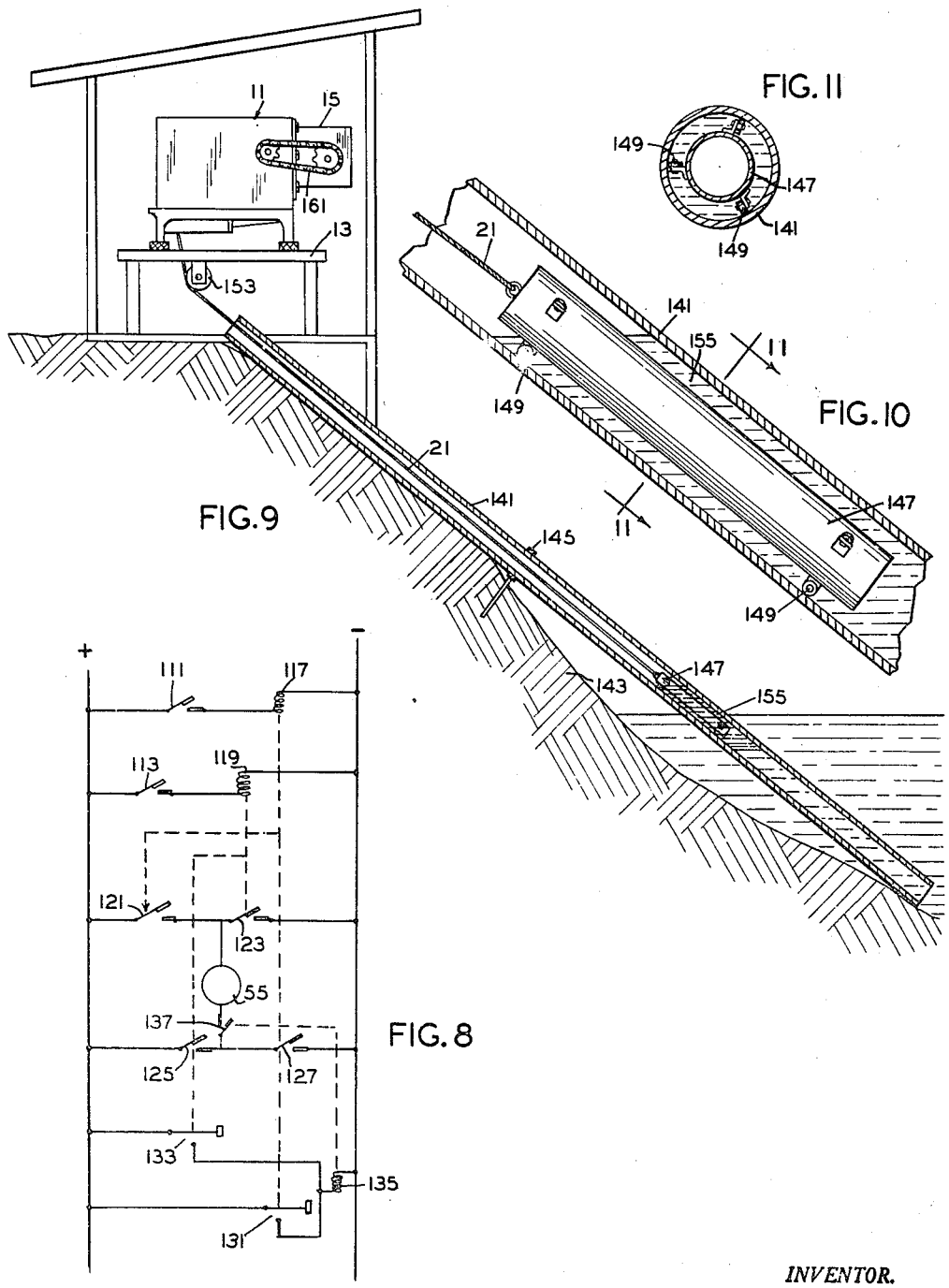
INVENTOR.
JOHN C. STEVENS
BY
Buckhorn and Cheatham
ATTORNEYS

United States Patent Office 2,770,133
Patented Nov. 13, 1956

2,770,133

LIQUID LEVEL INDICATING APPARATUS

John C. Stevens, Portland, Oreg., assignor to Leupold & Stevens Instruments, Inc., Portland, Oreg., a corporation of Oregon Application June 29, 1954, Serial No. 440,066

5 Claims. (Cl. 73—305)

This invention relates to apparatus for indicating or recording changes in a variable condition, and in particular to such an apparatus adapted for indicating or recording changes in water level.

The conventional water level recording or indicating apparatus is designed to be driven by its float arrangement, and the float must be of a considerable size in order to avoid excessive lag errors in the recording. A float line operatively connects the float to the indicating or recording mechanism of the apparatus, the other end of the line being connected to a suspended counterweight, or equivalent device, which cooperates with the float in causing operation of the indicating or recording mechanism in response to changes in the water level.

The conventional apparatus above described is thus bulky, in that the large float and counterweight require considerable vertical space in which to operate. If the installation is to include a stilling well, the well, in order to accommodate the float and counterweight movement, must be of considerable size and thus is expensive. The present practice for river, lake and reservoir gaging stations is to make the well large enough for a man to enter by means of a ladder to permit shoveling out silt and sand that enters through the small, horizontal inlet pipe to the well, to break ice and for other purposes. The small inlet pipe serves to dampen out the waves and surges in the parent body of water that would otherwise appear in the well and cause the stylus of the recorder to oscillate, making a broad, ragged graph instead of a normal fine line.

Another disadvantage of the conventional apparatus is that because of its bulk it cannot be used where the most convenient or only access to a body of water or other liquid is provided by a small opening or pipe, as frequently is the case.

A main object of the present invention is to provide an indicating or recording apparatus, of the type including a line connecting the float or other condition responsive means to the recording or indicating mechanism, which has considerably less bulk than prior apparatus.

Another main object of the present invention is to provide a gaging apparatus which has, instead of a large stilling well and a small, horizontal inlet pipe, a small vertical or inclined pipe within which the float is disposed, the pipe being wide open at its lower end to thus be incapable of holding sand or silt therein, and therefore it remains clean.

Another object of the present invention is to provide an apparatus of the above character having an arrangement for damping out surging movement, transmitted from the float to the recording or indicating mechanism, so that a record made of the float level will clearly and accurately show the average river or lake stages.

A more particular object of the present invention is to provide an indicating or recording apparatus of the character just mentioned which is motor driven under the control of a buoyant float, whereby the bulk of the apparatus is decreased because no suspended counterweight is employed and the float need be only of a size to control, instead of drive, the indicating or recording mechanism.

A further object of the present invention is to provide an indicating or recording apparatus of the character referred to above wherein the float, positioned by the liquid on which it rests, controls the indicating or recording mechanism through the medium of a new and improved control arrangement.

A still further object of the present invention is to provide an indicating or recording apparatus of the character under consideration wherein the control arrangement includes a new and improved tension sensing means which detects variations in the tension of the line and operates the indicating or recording mechanism accordingly.

A still further object of the present invention is to provide an indicating or recording apparatus of the character under consideration wherein the tension sensing means includes a new and improved follower device arranged to deflect the line and to detect changes in the tension of the line.

A further object of the present invention is to provide a simple water level recording or indicating apparatus for installation on the bank of a river, lake or reservoir, the apparatus including an inclined conduit which is adapted to be disposed on the bank of the river and contain the float.

Various other objects of the present invention will be apparent from the following description taken in connection with the accompanying drawings, wherein:

Fig. 1 is a side elevational view of an apparatus embodying the concepts of the present invention and adapted to indicate the level of a body of water;

Fig. 2 is an enlarged side elevational view of the recorder drive mechanism disclosed in Fig. 1, the casing or housing being removed;

Fig. 3 is an end view of the mechanism disclosed in Fig. 2, taken in the direction of the arrows 3—3 in Fig. 4;

Fig. 4 is a plan view of the mechanism disclosed in Fig. 2;

Fig. 5 is a side elevational view of the mechanism taken from the opposite side from that shown in Fig. 2, being taken in the direction of the arrows 5—5 in Fig. 3;

Fig. 8 is a schematic circuit diagram showing the manner in which the two control switch are connected to the reversible drive motor;

Fig. 9 is a view partly in section, taken in side elevation, of a second apparatus embodying the concepts of the present invention;

Fig. 10 is an enlarged fragmentary view of the portion of the conduit disclosed in Fig. 9 containing the float, and Fig. 11 is a cross section taken along line 11—11 of Fig. 10.

Figure 6:
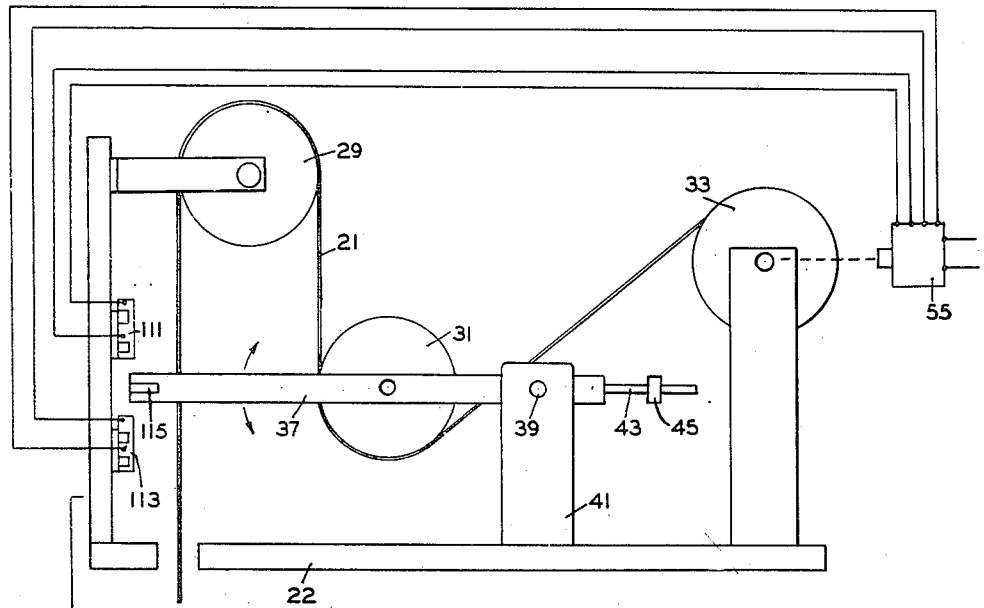
Fig. 6 is a schematic view of the apparatus disclosed in Figs. 1 through 5.

Referring to the accompanying drawings wherein similar reference characters designate similar parts throughout, the apparatus disclosed in Fig. 1 includes a recorder drive mechanism 11 mounted on a platform 13 and adapted to drive a recorder 15. The recorder drive mechanism is controlled by a float 17 contained within a vertical conduit or pipe 19, which is wide open at its submerged end, the float being positioned by the water within the pipe that stands at the same level as that of the parent body of water. The float is connected by a line 21 to the recorder drive mechanism in a manner to be presently set forth. The float may have wheels at each end to prevent it from being held to the sides of the pipe by capillarity.

The recorder drive mechanism is best shown in Figs. 2 through 6, the mechanism including a base 22 presenting a flat upper face and being mounted on the platform 13 by conventional leveling screw devices 23. Upstanding from the left-hand end of base 22 is an end wall 25, and fitting against the side and top edges of the end wall are the side and top edges of a casing or housing 27 which is held on the base by conventional means.

Line 21 passes upwardly through base 22, as indicated in Fig. 2, through an opening not shown, and passes over a stationary sheave 29, then passes down under a movable follower sheave or roller 31 and then passes upwardly and around and is connected to a reel drum 33. Sheave 29 is mounted on end wall 25 by means of a bracket 35. Follower roller 31 is mounted on a follower arm 37 which is pivoted at 39 on a U-shaped standard 41, compare Figs. 2 and 3. Extending from the rear of arm 37 is a fixed rod 43 having threaded thereon an adjustable counterweight in the form of a nut 45.

Drum 33 has its shaft 47 rotatably mounted on a pair of spaced standards 49 and 51, which are fixed at their lower ends to base 22, see Fig. 3. Shaft 47 is adapted to drive the recorder 15 by means of a chain and sprocket drive at 53, compare Figs. 1 and 3. Instead of a chain and sprocket, gearing or a flexible shaft may be employed. The recorder 15 and the recorder drive mechanism 11 may be considered as a recording or indicating mechanism. It is apparent from the foregoing description that arm 37 and roller 31 constitute a biasing follower means which deflects the line 21 from a straight line path between sheave 29 and drum 33.

Reel drum 33 is adapted to be driven by a conventional, reversible, direct current electric motor 55 which is mounted on base 22. Motor 55 is adapted to drive drum 33 through a gear train, including a worm 57 mounted on the motor output shaft, a worm wheel 59, the shaft of which carries a second worm 61 meshing with a worm wheel 63, the shaft of which carries a spur gear 65 meshing with a spur gear 67 mounted on the drum shaft 47. The shaft for worm wheel 59 and worm 61 is rotatably mounted on standard 51 by a bracket 71, see Fig. 5, and the shaft for worm wheel 63 and spur gear 65 extends through and is rotatably supported by standard 51, as indicated in Fig. 3.

A level wind mechanism is provided to insure that as line 21 is wound onto the reel the coils will not overlap. Line 21, after leaving roller 31, passes between a pair of rotary spools 81 which are mounted by means of a bracket 83 on standard 41. Line 21 then passes between a pair of rotary spools 85, which are mounted by means of a bracket 87 on a level wind guide 89. Threadedly extending through the lower portion of the level wind guide 89 is a lead screw 91 which is rotatably supported from standards 49 and 51 by brackets 93, see Fig. 4. Screw 91 is driven from the drum shaft 47 by means of spur gears 95 and 97, see Fig. 3.

Brackets 93 support a horizontal guide rod 101 in a position above screw 91, said rod slidably extending through the upper portion of level wind guide 89, see Fig. 5. The upper end of level wind guide 89 is formed with a notch 103 through which the cable 21 passes to be guided onto the drum 33.

Figure 7:
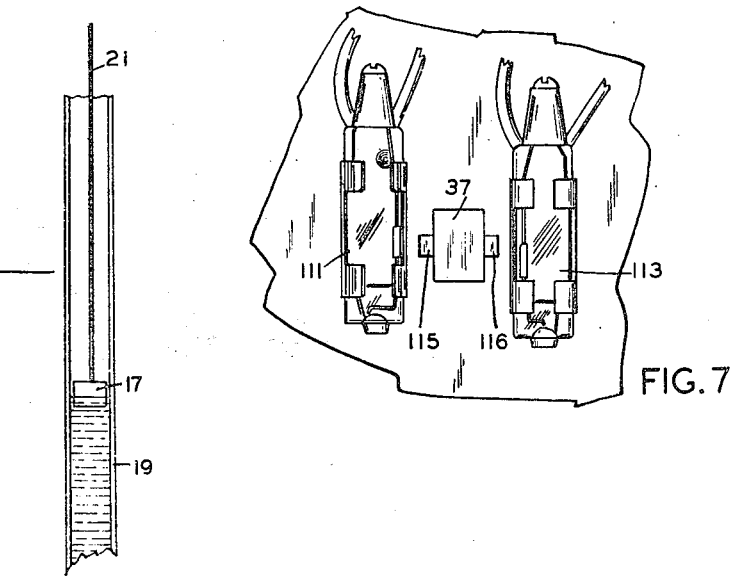
Fig. 7 is an enlarged fragmentary view taken in the direction of the arrows 7—7 in Fig. 2, showing the relationship of the follower arm and the two control switches.

Motor 55 is normally de-energized or at rest, but is adapted to be energized when either of two normally open switches 111 or 113 is closed. Referring particularly to Figs. 7 and 8, it is there shown that switches 111 and 113, in the particular embodiment of the invention disclosed, comprise conventional mercury switches, switch 111 being disposed at a somewhat higher level than switch 113. Follower arm 37 carries at its front end a permanent magnet 115 for switch 111 and a permanent magnet 116 for switch 113, said magnets being normally disposed in a neutral position, see Fig. 7, between the switches so as to leave the switches open. By suitable adjustment of nut 45 such a neutral position may be attained.

Fig. 8 shows that switches 111 and 113 are connected through a conventional reversing circuit to motor 55. Switch 111 is connected across the power supply conductors shown, in series with a relay coil 117, and switch 113 is similarly connected across said power supply conductors in series with a relay coil 119. Also connected across the power supply conductors are two sets of relay contacts 121 and 123 connected in series, and also two sets of relay contacts 125 and 127 connected in series. Motor 55 is connected to contacts 121, 123, 125 and 127 in a conventional manner. Relay coil 117 is adapted to control the operation of the contacts 121 and 127, whereas relay coil 119 is adapted to control the operation of the contacts 123 and 125.

Coil 117 also controls a conventional weighted spring vibrating relay contact unit at 131, and coil 119 controls a conventional weighted spring vibrating relay contact unit at 133. These contacts units are connected in parallel with one another and in series with a slow acting, direct current relay coil 135. Coil 135 controls contacts 137 in the motor circuit.

The operation of the apparatus is best described in connection with Figs. 6 and 8. Follower roller 31 and follower arm 37 are designed to exert a sufficient downward force to substantially deflect line 21, this force being of a magnitude to partially suspend said float. That is to say, the force will keep line 21 reasonably taut and balance the upward pressure of the water on the float when at its neutral depth of flotation. It is contemplated that a sufficiently light weight line will be used so that, for all practical purposes, its weight is of no importance to the operation of the apparatus. Thus, shortening or lengthening the portion of the line between sheave 29 and float 17 during operation will have no substantial effect on the operation of the apparatus. Fig. 6 indicates a neutral position of the parts where the motor 55 is de-energized and the arm 37 is in a neutral position with magnets 115 and 116 disposed in inoperative positions relative to mercury switches 111 and 113, respectively.

If the level of the liquid in which float 17 is partially submerged rises, line 21 is momentarily slackened so that arm 37 and roller 31 drop slightly to bring magnet 116 into operative relationship with mercury switch 113 to close said switch. Closing of switch 113 energizes relay coil 119, which causes relay contacts 123 and 125 to close and urges contact unit 133 to close. Contact unit 133 will vibrate, however, for a brief, predetermined period and then stay closed providing switch 113 remains closed. Relay coil 135, being slow acting, will not close contacts 137 until contact unit 133 stops vibrating. Thus, surging action of the float does not affect motor 55. When coil 135 does close contacts 137, motor 55 is energized to rotate in a direction to cause the reel drum 33 to wind in the line 21. As the line 21 is wound in, roller 31 and arm 37 are elevated to bring magnet 116 back to its neutral position whereupon switch 113 is opened and relay coil 119 de-energized to cause relay contacts 123, 125 and 137 to open to de-energize motor 55. The apparatus is thus restored to its neutral condition.

If the water level in conduit 19 should fall, float 17, being only partially suspended, will tend to follow the falling water level thus pulling upwardly on roller 31 and arm 37 to bring magnet 115 into operative relationship with mercury switch 111 to close the switch. Closing of switch 111 energizes relay 117 which operates to close relay contacts 121 and 127 and urge contact unit 131 to close. When such unit stops vibrating, coil 135 will close contacts 137 to drive motor 55 in the reverse direction so as to pay out line on the reel drum 33 until float 17 once again assumes its equilibrium position, at which time arm 31 will be restored to its neutral position, allowing mercury switch 111 to open. Opening of this switch causes motor 55 to be de-energized to again return the apparatus to its neutral condition.

The apparatus described in Figs. 1 through 8 is considerably less bulky than the conventional apparatus, since no suspended counterweight is employed and the float need be only of a size to control, and not to drive, the indicating or recording mechanism. Thus, the well for an installation may be of small size. For instance, the well may be a pipe of relatively small diameter, such as three inches. In contrast to this, the conventional float well is generally large enough for a man to enter. Furthermore, the apparatus of the present invention may be used as a probe for indicating or recording changes in water or liquid level in places where the most convenient or only access to the body of water or liquid is through a small opening or a small pipe.

Although the apparatus shown and described includes a float, the float is to be considered merely as a condition responsive means which is movable in response to changes in a condition. Other condition responsive means of various types will readily occur to those skilled in the art, and thus the invention is not intended to be limited to the specific condition responsive means shown. Also, similar remarks are applicable to the disclosure of a recorder since it is to be considered as only one type of an indicating, recording or registering means. Other types will readily occur to those skilled in the art.

Furthermore, although mercury switches are shown, these are to be considered merely as motor control devices, and other devices will readily occur to those skilled in the art.

Figs. 9, 10 and 11 show a second apparatus embodying the concepts of the present invention. The installation shown includes an inclined conduit or pipe 141, resting on the bank 143 of a river, lake or reservoir and held in place by any suitable anchoring means at 145. The conduit 141 contains an elongated, hollow, cylindrical float 147 provided with two sets of circumferentially spaced wheels 149 engaging the inner walls of said pipe. The pipe 141 is disposed in a position with its lower end submerged in the water. A line 21 is connected to the float at one end and at its other end is connected to a recorder drive mechanism 11. A sheave 153 mounted on the bottom of platform 13 guides line 21 upwardly into the recorder drive mechanism 11. In order to lubricate the wheeled float 147, a quantity of oil 155 is provided in pipe 141 floating on the water.

The recorder drive mechanism 11 is identical to the mechanism disclosed in Figs. 1 through 6, but it is pointed out that it drives the recorder 15 through a sprocket and chain drive or gearing which is designed to compensate for the fact that the conduit 141 is inclined. That is, the pen of the recorder or indicator 15 will register vertical heights. Surges appearing in the pipe from the parent body of water will cause the upper wheels of the float to be oiled occasionally.

The apparatus of Figs. 9, 10 and 11 is considerably less expensive than the conventional river bank installation where a large vertical well is formed in the bank and connected at its lower end to one end of a horizontal pipe laid in a deep trench or tunnel, the other end of which communicates with the water in the river. An installation employing an inclined conduit is made possible by the apparatus of the present invention because no vertical space need be provided for operation of the conventional suspended counterweight. Also, the inclined conduit may be made of small size since the float need only be of a size to control, and not to drive, the recording or indicating mechanism. Moreover, the pipe cannot become choked with silt and sand because the end in the water is open full size.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. In an indicating apparatus, a movable condition responsive element, a drum, a line connecting the two, a follower, means yieldingly mounting said follower in an intermediate rest position in deflecting engagement with said line for movement from said rest position to further deflect said line when said condition responsive device moves to slacken the line or for yielding movement from said rest position to permit straightening of said line when said condition responsive means moves to tighten said line, means responsive to follower movement for operating said drum to pay out or reel in line in a manner to restore said follower to said position, and means for indicating drum movement.

2. In an indicating apparatus, a condition responsive mechanism movable in response to changes in a variable condition, a line, connected at one end to said condition responsive mechanism, means tensioning the line including means connected to the other end of said line for paying out or taking in line, a follower disposed along said line at a place between said condition responsive mechanism and said means for paying out or taking in line, means yieldingly mounting said follower in deflecting engagement with said line for movement from an initial position to further deflect said line when said condition responsive mechanism moves to slacken said line or for yielding movement to permit straightening of said line when said condition responsive mechanism moves to tighten said line, means operatively connecting said follower and said means for paying out or taking in line responsive to movement of said follower to operate said means for taking in or paying out line so as to cause said line to follow said condition responsive mechanism whereby to restore said follower to its initial position, and means for indicating the extent of line movement caused by said means for paying out or taking in line.

3. An indicating apparatus comprising condition responsive means movable in response to a change in a variable condition, a power driven reel, a line connecting said condition responsive means and said reel, biasing means deflecting said line at a place between said condition responsive means and said reel to place said line under tension, said biasing means adapted to move in one direction from a neutral position to further deflect said line when said condition responsive means moves in a direction tending to slacken said line and adapted to be moved from said neutral position in the opposite direction by said line when said condition responsive means moves in a direction tending to further tension said line, means responsive to movement of said biasing means from said neutral position for energizing said power driven reel in a manner to wind in or pay out the line an extent sufficient to restore said biasing means to its neutral position, and means for indicating the extent of movement of said reel as an index of the change in said condition.

4. A water level indicating apparatus comprising a float, a line connected at one end to said float, reel means connected to the other end of said line, reversible motor means drivingly connected to said reel means, a stationary sheave between said float and said reel means over which said line is trained, a movable roller between said sheave and said reel means under which said line is trained, a pivoted arm supporting said movable roller whereby the weight of said roller and said arm are imposed on said line to deflect the same, switch means associated with said arm and adapted to close one circuit to said reversible motor means in response to movement of said arm in one direction and to close a second reversing circuit to said motor in response to movement of said arm in the opposite direction.

5. An indicating apparatus comprising a condition responsive device movable in response to a change in a variable condition, a flexible member connected at one end to said device, motor driven means connected to the opposite end of said flexible member adapted for selective operation to pay out or draw in said flexible member, biasing means having a neutral rest position deflecting said flexible member at a point between said condition responsive means and said motor driven means, two normally open switches operatively associated with said biasing means and adapted to be selectively closed upon movement of said biasing means in opposite directions, and reversing circuit means connecting said switches to said motor driven means and adapted upon closure of one switch to energize said motor driven means for operation in one direction and upon closure of the other switch to energize said motor driven means for operation in the reverse direction.

References Cited in the file of this patent

UNITED STATES PATENTS

| | | |
|---|---|---|
| 505,619 | Williams | Sept. 26, 1893 |
| 1,742,439 | Farnsworth | Jan. 7, 1930 |
| 1,773,709 | Daniels | Aug. 19, 1930 |
| 1,857,817 | McCann | May 26, 1934 |
| 2,657,577 | Falk | Nov. 3, 1953 |

FOREIGN PATENTS

| | | |
|---|---|---|
| 409,102 | Great Britain | Apr. 26, 1934 |